United States Patent [19]
Koike

[11] Patent Number: 6,164,577
[45] Date of Patent: Dec. 26, 2000

[54] SPOOL HAVING A SURFACE TREATMENT FOR USE IN A FISHING REEL

[75] Inventor: Mamoru Koike, Saitama, Japan

[73] Assignee: Daiwa Seiko Inc., Tokyo, Japan

[21] Appl. No.: 09/234,842

[22] Filed: Jan. 22, 1999

[30] Foreign Application Priority Data

Jan. 28, 1998 [JP] Japan .................................. 10-015659

[51] Int. Cl.⁷ .................................................. A01K 89/00
[52] U.S. Cl. .................. 242/322; 242/118.7; 242/610.4; 242/610.5
[58] Field of Search .................................... 242/322, 310, 242/311, 118.7, 613, 610.4, 610.5, 610.6

[56] References Cited

U.S. PATENT DOCUMENTS

| | | | |
|---|---|---|---|
| 2,472,603 | 6/1949 | Mayer .............................. | 242/610.4 X |
| 3,592,406 | 7/1971 | Martin et al. ........................ | 242/610.4 |
| 3,921,927 | 11/1975 | Esashi et al. ........................ | 242/118.7 |
| 4,451,012 | 5/1984 | Puryear et al. ......................... | 242/322 |
| 4,697,757 | 10/1987 | Nakaya et al. ........................ | 242/610.4 |
| 5,143,316 | 9/1992 | Goetz et al. ............................ | 242/129 |
| 5,195,699 | 3/1993 | Stinnette ................................. | 242/322 |
| 5,252,369 | 10/1993 | Akao et al. ........................... | 242/610.6 |
| 5,746,382 | 5/1998 | Tsutsumi ................................ | 242/322 |
| 5,875,986 | 3/1999 | Miyazaki et al. ....................... | 242/261 |
| 5,908,173 | 6/1999 | De Roeck ........................ | 242/610.4 X |

FOREIGN PATENT DOCUMENTS 63-42070  2/1988  Japan .

Primary Examiner—Donald P. Walsh
Assistant Examiner—Emmanuel M. Marcelo
Attorney, Agent, or Firm—Liniak, Berenato, Longacre & White

[57] ABSTRACT

A spool for use in a fishing reel, which is structured such that, by combining an electrolytic plating method, a non-electrolytic plating method, and a dry coating method properly and selectively, a metal film layer (14) having one of desired film thicknesses (T1, T2 and T3) is formed on the surface (outer peripheral surface) of the spool base material (12).

7 Claims, 3 Drawing Sheets

SPOOL HAVING A SURFACE TREATMENT FOR USE IN A FISHING REEL

BACKGROUND OF THE INVENTION

1. Field of the Invention

The present invention relates to a spool for use in a fishing reel and, in particular, to such spool the surface of which is treated in such a manner that not only the weight of the spool can be reduced but also the gloss of the outside of the spool and the durability thereof can be enhanced.

2. Description of the Related Prior Art

In a fishing reel, so as to enhance its operation efficiency, portability, and the like, conventionally, reduction of the weight has been proceeded. For this purpose, in such fishing reel, in most cases, there is used a spool in which, for example, instead of metal material such as aluminum or the like, resin material is used as the base material of the spool.

Especially, in a spool which is composed of a fishing line winding barrel portion and front and rear flange portions, in an actual fishing operation, when a fishing line with a load applied thereto is uniformly wound around the fishing line winding barrel portion of the spool, not only an excessive pressure is applied to the fishing line barrel portion due to the tightening force of the fishing line, but also, for example, when releasing the fishing line (playing out the fishing line), a friction force is applied to the spool because the fishing line released (played out) is frictionally contacted with the front flange portion of the spool.

In such cases, the surface of the spool can be damaged, or, large resistance can be applied to the fishing line when it is released (played out), thereby lowering the carrying distance of the fishing line or damaging and cutting the fishing line.

In order to solve the above problems, for example, in Japanese Utility Model Publication No. 63-42070 of Showa, there is proposed a spool in which ceramics is thermally sprayed and formed on the outer-most layer thereof.

In particular, to produce the spool, at first, an alloy having a low melting point is thermally sprayed onto the surface of the spool base material formed of synthetic resin, next, ceramics is thermally sprayed on the thus alloy thermally sprayed surface, and, finally, the thus alloy-and-ceramics thermally sprayed surface is abraded or polished into a smooth surface.

However, in the conventional spool, since the metal film layer or ceramics film layer are thermally sprayed and formed on the surface of the spool base material formed of synthetic resin, the degree of smoothness of the film layer surface is lowered and the thickness of the film layer is increased. Also, because the surface treatment temperature is high, the heat radiation of the spool surface is not good, which in turn has ill influences on the quality of the synthetic resin spool base material (in particular, the spool base material can be deformed, the quality thereof is degraded, the strength thereof is lowered, the dimensions thereof can be varied, the weight thereof is increased due to the large film thickness, and so on).

Also, in the conventional spool, in order to obtain the smoothness and gloss of the spool surface, as a finishing step, it is necessary to execute an abrading or polishing treatment on the spool surface to thereby obtain a desired smooth spool surface. Due to this, the base metal layer (that is, the metal layer formed of low-melting-point alloy) of the spool surface can be easily exposed, which in turn causes the spool surface to be corroded or damaged. And, when the fishing line is frictionally contacted with the exposed base metal layer, for example, in the fishing line releasing operation (that is, in the fishing line play-out operation), large resistance is applied to the fishing line, which lowers the carrying distance of the fishing line, or damages the fishing line to thereby cut the same.

Further, since the conventional spool surface treatment requires a large number of surface treatment processes, it takes long time to carry out the large number of surface treatment processes and also the costs necessary for such surface treatment processes are expensive.

Also, when ceramics is used in the outer-most layer of the spool, there cannot be obtained a metal appearance having a high-quality impression nor a handy-to-use impression. Therefore, such use of ceramics is not desirable from the viewpoint of the appearance of the spool.

SUMMARY OF THE INVENTION

The present invention aims at solving the above problems found in the conventional spool. Accordingly, it is an object of the invention to provide a spool for use in a fishing reel which, due to a simple surface treatment, not only is enhanced in the surface smoothness and glossy appearance thereof while reducing its weight, but also is excellent in durability and inexpensive in cost.

In attaining the above object, according to the invention, there is provided a spool for use in a fishing reel in which a metal film layer having a desired film thickness is formed on the surface of the spool base material made of synthetic resin through proper and selective combinations of an electrolytic plating method, a non-electrolytic plating method, and a dry coating method.

BRIEF DESCRIPTION OF THE DRAWINGS

FIG. 3 is a partially sectional view of a spool according to the invention; in particular.

DETAILED DESCRIPTION OF THE PREFERRED EMBODIMENT OF THE INVENTION

Now, description will be given below of a spool for use in a fishing reel according to an embodiment of the invention with reference to the accompanying drawings.

Figure 1:
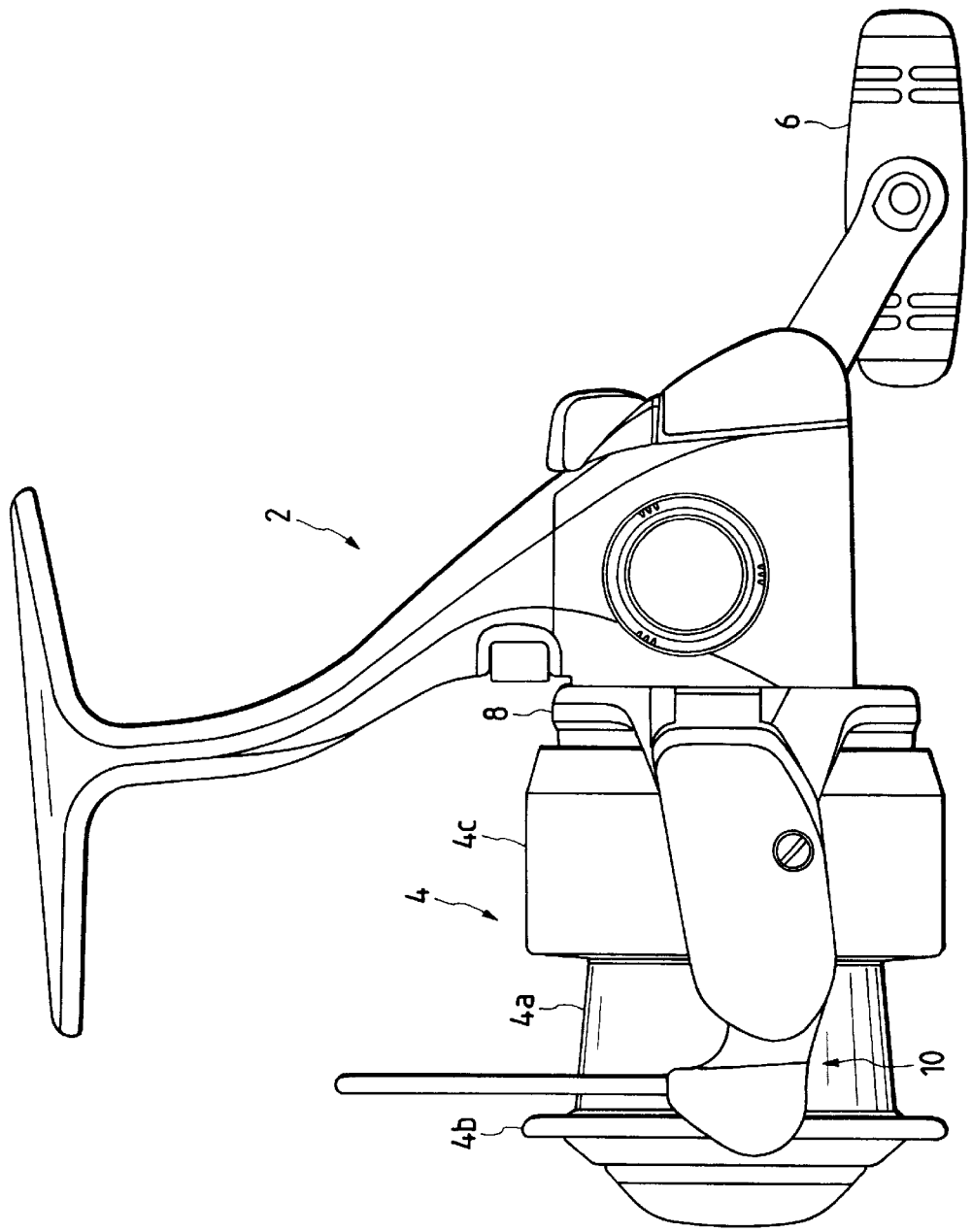
FIG. 1 is a view of the structure of a spinning reel for fishing to which a spool according to the invention is applied.
Figure 2:
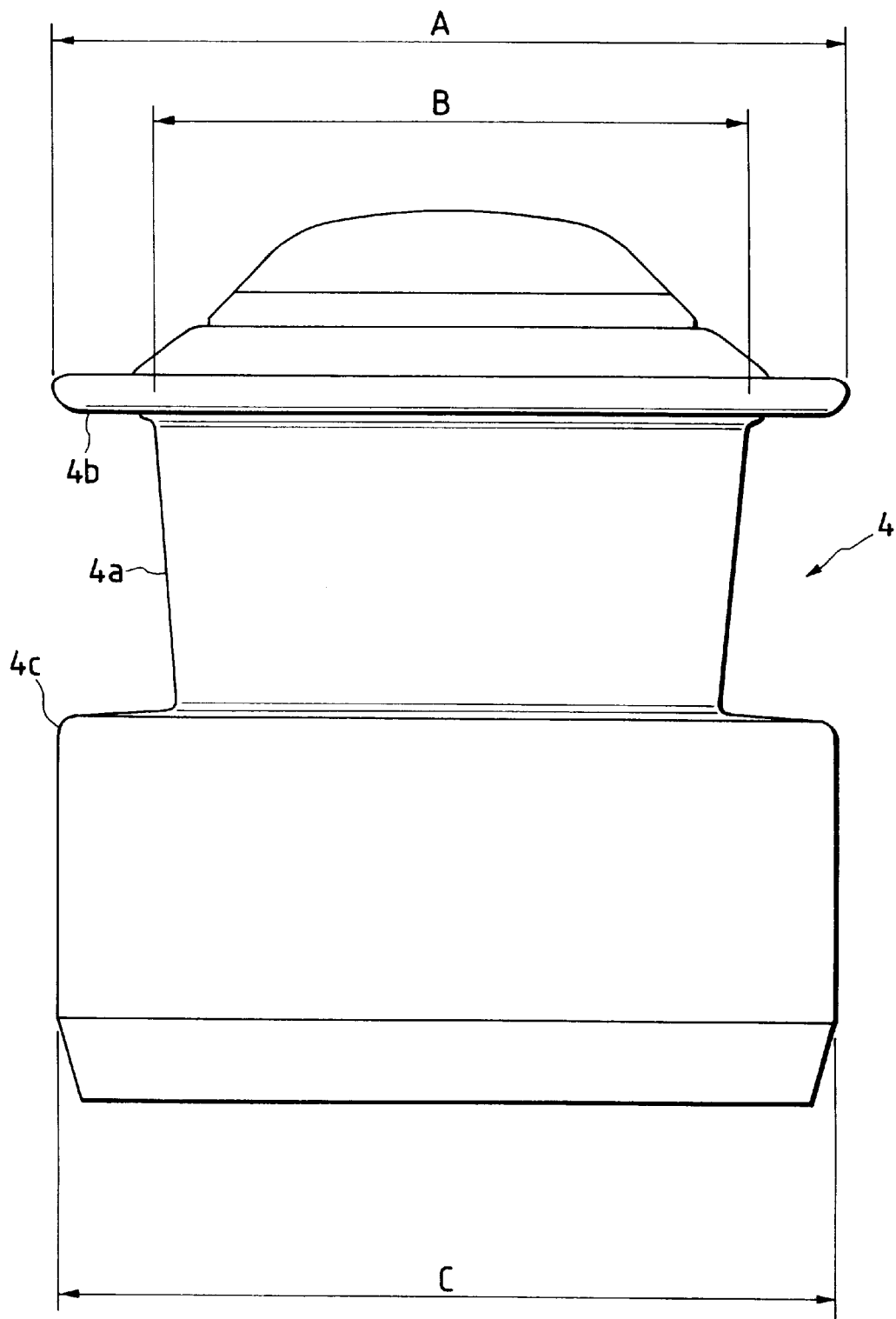
FIG. 2 is a view of the structure of a spool according to the invention.

In FIG. 1, there is shown the structure of a spinning reel 2 for fishing, as an example to which the present embodiment is applied; and, in FIG. 2, there is shown the structure of a spool 4 which is applied to the spinning reel 2 for fishing.

Referring now to the structure of the spool 4, such surface treatment (see FIG. 3) as will be discussed later is enforced on the whole of the surface of the spool 4; and, the spool 4 comprises a fishing line winding barrel portion 4a, and a front flange portion 4b and a rear flange portion 4c which are formed on opposite sides of the fishing line winding barrel portion 4a.

Also, the fishing line winding barrel portion 4a is tapered at a given angle in such a manner that the diameter thereof decreases continuously and smoothly as it goes from the front side thereof toward the rear side thereof along a spool shaft (not shown) (in particular, as it goes from the front flange portion 4b to the rear flange portion 4c). By the way, preferably, the fishing line winding barrel portion 4a may be designed in such a manner that it forms a shallow groove and provides a large diameter and a long stroke.

In this case, if the outside dimension of the front flange portion 4b is expressed as A, the outside dimension of the portion of the fishing line winding barrel portion 4a that is situated near to the front flange portion 4b (that is, the outside dimension of the portion where the diameter is the largest) is expressed as B, and the outside dimension of the rear flange portion 4c is expressed as C, then the ratio of the outside dimension B to the outside dimension A (B/A) may be preferably set in the range of 70%–90%, and the ratio of the outside dimension C to the outside dimension A (C/A) maybe preferably set in the range of 95%–105%.

According to the present spinning reel 2 for fishing, if a handle 6 is operated or rotated, then the spool 4 is moved back and forth together with the rotation of a rotor 8, so that a fishing line (not shown) can be wound uniformly around the fishing line winding barrel portion 4a of the spool 4 through a line roller (not shown) included in a bail arm mechanism 10.

Next, description will be given below of a method for executing a surface treatment on the above-structured spool 4 with reference to FIG. 3.

In the present embodiment, the spool 4 is structured in such a manner that a film layer 14 made of metal material having a desired film thickness is formed on the surface (outer peripheral surface) of a spool base material 12 according to a surface treatment method (which will be discussed later).

In this case, as the spool base material 12, there can be employed synthetic resin material such as polyamide (PA) resin, glass fiber reinforced polyamide resin which consists of polyamide resin mixed with a given amount of reinforcing glass fibers, ABS (acrylonitrile-butadiene-styrene) resin, glass fiber reinforced ABS resin which consists of ABS resin mixed with a given amount of reinforcing glass fibers, polycarbonate resin and so on.

As the surface treatment method, either of a wet coating method or a dry coating method, or a combination of them can be used properly and selectively according to cases. And, to realize the wet coating method, either of an electrolytic plating method or a non-electrolytic plating method, or an arbitrary combination of them can be used properly and selectively according to cases. Also, to realize the dry coating method, either of a physical vaporization method (PVD) or a chemical vaporization method (CVD), or an arbitrary combination of them can be used properly and selectively according to cases.

By the way, as the wet coating method, there are available a nickel plating method, a chromium plating method (a plating method using velours chromium, a plating method using hard chromium), a composite plating method (a plating method using nickel-phosphor, a plating method using nickel-boron, and a plating method using nickel-polytetrafluoroethylene), a copper plating method, and the like.

Also, as the dry coating method, there are available a titan plating method (a plating method using pure titan, a plating method using titan nitride, and a plating method using titan carbide), a chromium plating method, a nickel plating method, an aluminum plating method, and the like.

And, according to the dry coating method, when compared with the wet coating method, not only a thin and light film can be formed on the surface of the spool, but also the spool surface appearance, the abrasion resistance and corrosion resistance of the spool surface, the weather resistance and cleaning property of the spool surface, and the like can be enhanced.

Also, as the physical vaporization method (PVD), there are available a vacuum vaporization method, a spattering method, an ion plating method, and the like; and, as the chemical vaporization method (CVD), there are available a plasma CVD method, an organic metal CVD method, and the like.

Finally, the electrolytic plating method is a method which uses electrolytic plating to coat the surface of a cathode substance (in the present embodiment, the spool base material 12) with a metal film; and, the electrolytic plating method can be used effectively for surface hardening and surface decoration.

On the other hand, the non-electrolytic plating method is a method which does not use electric energy but uses the chemical or reducing actions of metals between them to thereby form a metal film on the surface of a substance (in the present embodiment, the spool base material 12). The non-electrolytic plating method is characterized in that it is able to form a metal film which is excellent in the close contact property and gloss, and is also uniform, smooth and thin.

And, by properly selecting one of the above-mentioned various surface treating methods or combining them arbitrarily according to the material quality of the spool base material 12, the film layer 14 having a desired thickness can be formed on the surface (outer peripheral surface) of the spool base material 12.

In this case, as the metal material that can be used to form the film layer 14, for example, there are available Fe, Co, Ni, Pd, Ir, Pt, Cu, Ag, Au, Zn, Sn and the like. Also, referring to the film thickness of the film layer 14, when the glass fiber reinforced spool base material 12 is used, preferably, the film thickness may be set in the range of about 0.01–15 $\mu$m. On the other hand, when the spool base material 12 not reinforced by glass fibers is used, preferably, the film thickness may be set in the range of about 0.15–30 $\mu$m.

Figure 3A:
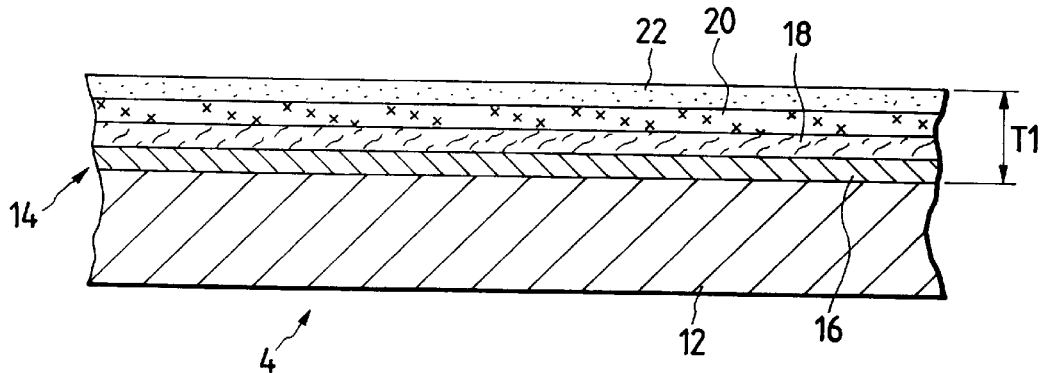
FIG. 3(a) is a partially sectional view of a spool structured such that a film layer is formed on the spool base material thereof according to a first surface treating method.
Figure 3B:
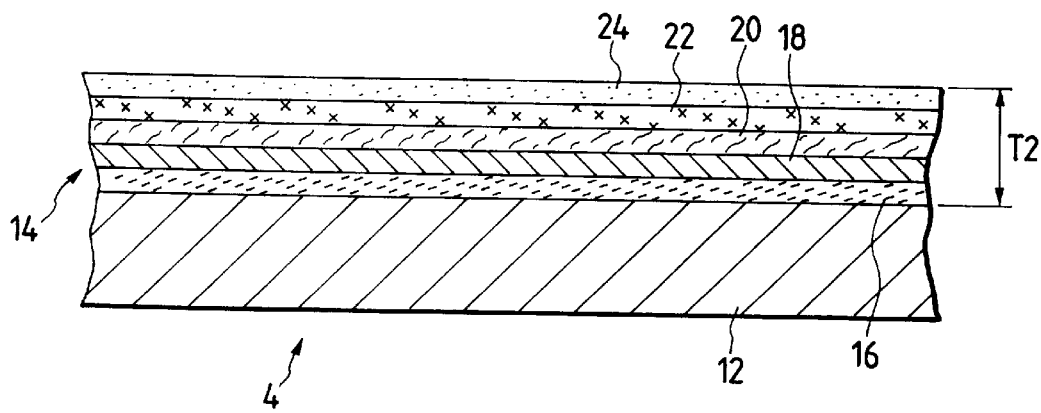
FIG. 3(b) is a partially sectional view of a spool structured such that a film layer is formed on the spool base material thereof according to a second surface treating method.
Figure 3C:
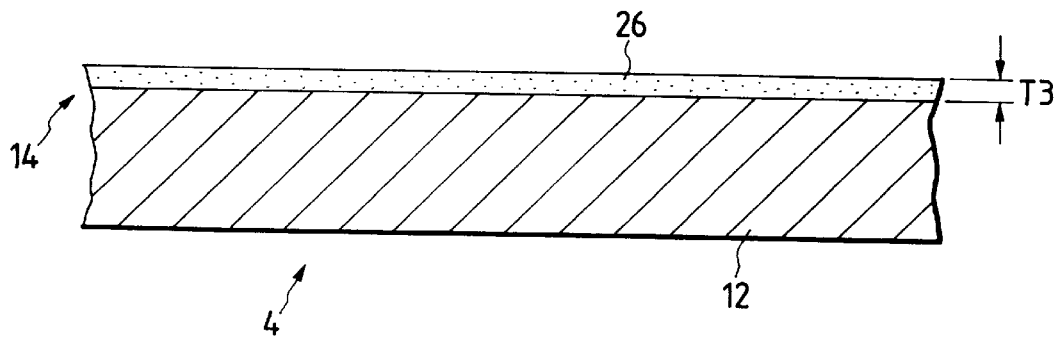
FIG. 3(c) is a partially sectional view of a spool structured such that a film layer is formed on the spool base material thereof according to a third surface treating method.

Now, FIGS. 3(a), (b) and (c) are respectively partially sectional views of the spool 4 structured such that the metal film layer 14 having a desired film thickness is formed on the surface (outer peripheral surface) of the spool base material 12 according to the above-mentioned surface treating methods.

In particular, in a surface treating method shown in FIG. 3(a) (which is hereinafter referred to as a first surface treating method), as an example, there is used spool base material 12 which is injection formed using the blended material of ABS and polycarbonate; and a film layer 14 composed of a plurality of layers is plated on the surface (outer peripheral surface) of the thus formed spool base material 12 in such a manner that it has a desired film thickness T1.

In this example, the film layer 14 is composed of a base metal layer 16 which is formed on the surface (outer peripheral surface) of the spool base material 12 according to the non-electrolytic plating method or dry coating method, and an outer film layer formed on the surface of the base metal layer 16 according to the electrolytic plating method or dry coating method.

As the base metal layer 16, in the present embodiment, as an example thereof, there is employed a nickel layer 16 which is formed of nickel material. On the other hand, the outer film layer, as an example thereof, is composed of a copper layer 18, a nickel layer 20 and a chromium layer 22 which are respectively formed by electrolytically plating copper, nickel and chromium continuously and are then piled up on the base metal layer 16 in this order.

Also, in a surface treating method shown in FIG. 3(*b*) (which is hereinafter referred to as a second surface treating method), as an example, there is used spool base material 12 which is injection formed using glass fiber reinforced ABS (acrylonitrile-butadiene-styrene) resin which consists of ABS mixed with a given amount of reinforcing glass fibers; and a film layer 14 composed of a plurality of layers is plated on the surface (outer peripheral surface) of the thus formed spool base material 12 in such a manner that it has a desired film thickness T2.

In this example, the film layer 14 is composed of a base metal layer consisting of a plurality of layers formed on the surface (outer peripheral surface) of the spool base material 12 according to the above-mentioned first surface treating method, and an outer film layer 24 formed on the surface of the base metal layer according to the dry coating method (for example, physical vaporization method (PVD)).

In this case, the base metal layer is composed of a nickel layer 16, a copper layer 18, a nickel layer 20, and a chromium layer 22 which are piled up on the surface (outer peripheral surface) of the spool base material 12 in this order. On the other hand, as the outer film layer 24, for example, there can be employed metal oxides such as TiO, $TiO_2$, $In_2O_3$, ZnS, SiO, $MgF_2$, $Al_2O_3$ and the like, or metal fluorides. These inorganic compounds may be formed in a single layer or in a plurality of layers.

Further, in a surface treating method shown in FIG. 3(*c*) (which is hereinafter referred to as a third surface treating method), as an example, there is used spool base material 12 which is injection formed using polyamide (PA) resin; and a film layer 14 is plated on the surface (outer peripheral surface) of the thus formed spool base material 12 in such a manner that it has a desired film thickness T3.

In this example, the film layer 14 is composed of an outer film layer 26 which is formed on the surface of the spool base material 12 according to the dry coating method (for example, physical vaporization method (PVD)).

In this case, as the outer film layer 24, for example, there can be employed metal oxides such as TiO, $TiO_2$, $In_2O_3$, ZnS, SiO, $MgF_2$, $Al_2O_3$ and the like, or metal fluorides. These inorganic compounds may be formed in a single layer or in a plurality of layers.

As described above, by combining the electrolytic plating method, non-electrolytic plating method, and dry coating method properly and selectively, on the surface (outer peripheral surface) of the spool base material 12, there can be formed the thin film layer 14 which is excellent in the close contact property, beautiful appearance and gloss, abrasion resistance, corrosion resistance, weather resistance, and cleaning property, is hard and light, and can have one of the film thicknesses T1, T2 and T3.

Referring in more particular to the film thicknesses T1, T2 and T3 of the film layer 14, they can be set in the desired thickness ranges respectively: that is, T1 can be set in the range of about 10–30 $\mu$m; T2 in the range of about 5–15 $\mu$m; and, T3 in the range of about 0.01–1 $\mu$m.

Referring further to the reduction of the weight of the spool, when compared with the currently used resin spool or aluminum spool, the weight (grams) of the present spool can be reduced down to about one half.

Also, according to the above-mentioned methods, since the thin film layer 14 can be formed at a low surface treatment temperature, the heat radiation property of the spool can be enhanced. This eliminates the possibility that heat generated in the surface treatment can have ill influences on the quality of the spool base material 12 formed of synthetic resin (in particular, the spool base material can be deformed, the quality thereof is degraded, the strength thereof is lowered, the dimensions thereof can be varied, the weight thereof is increased due to the large film thickness, and so on).

Further, according to the above-mentioned methods, because there can be formed the thin film layer 14 which is uniform, smooth and hard, for example, in the fishing line releasing operation (in the fishing line play-out operation), resistance to be applied to the fishing line can be reduced. As a result, not only the carrying distance of the fishing line can be enhanced but also the fishing line and the surface of the spool 4 are made difficult to be damaged. Especially, with respect to the abrasion resistance of the spool, the present spool can be about four or five times as strong as the currently used resin spool or aluminum spool.

Still further, according to the above-mentioned methods, since the number of surface treating processes necessary to treat the surface of the spool can be reduced (for example, there is eliminated a finishing or polishing process for smoothing of the spool surface), the time and cost required for execution of the surface treatment of the spool can be reduced to a great extent.

Yet further, according to the above-mentioned methods, because there can be formed a uniform and smooth film layer 14, it is possible to provide not only a metal appearance having a high-quality impression but also a handy-to-use impression.

Also, since the spool 4 including the fishing line winding barrel 4*a* (see FIG. 2) formed in a shallow groove and having a large diameter and a long stroke receives a small fishing line tightening force per unit area when compared with a spool (not shown) including a fishing line winding barrel (not shown) formed in a deep groove and having a small diameter and a short stroke, it is possible to employ spool base material which is of low strength and low rigidity. Due to this, in the above-mentioned surface treating methods, synthetic resin material (resin of a plating grade) can be used as the spool base material 12. As a result, it is possible to realize a spool 4 which has a weight as light as resin and provides a metal appearance having a stately impression or a high-quality impression.

Although, in the above-mentioned methods, there is used the spool base material 12 which is formed by injection forming synthetic resin, for example, if the synthetic resin spool base material 12 is molded using a spool molding metal mold which is polished in a mirror-surface-like state, then the uneven portions of the surface (outer peripheral surface) of the molding, that is, spool base material 12 can be eliminated completely.

In this case, the film layer 14 formed on the surface of the spool base material 12 according to the above-mentioned method is hard and excellent in smoothness or flatness, so that, for example, in the fishing line releasing operation in the fishing line play-out operation), resistance against the fishing line can be reduced down to a very small level. As a result, not only the carrying distance of the fishing line can be enhanced greatly but also the fishing line and the surface of the spool 4 are made difficult to be damaged.

By the way, in the above-mentioned embodiment, as an example thereof, description has been given of a spinning reel. However, this is not limitative but the present embodiment can also apply to other types of reels, such as a closed-face type reel, a double-bearing type reel and the like. That is, the present embodiment is not limited by the types of reels.

As has been described heretofore, according to the invention, it is possible to provide a spool for use in a fishing reel which, due to a simple surface treatment, not only is enhanced in the surface smoothness and glossy appearance thereof while reducing its weight, but also is excellent in durability and inexpensive in cost.

What is claimed is:

1. A spool for use in a fishing reel, comprising:

a fishing line winding barrel portion around which a fishing line can be wound, and a front flange portion and a rear flange portion formed on opposite sides of said fishing line winding barrel portion;

said barrel portion, said front flange portion and said rear flange portion being formed with a spool base material formed of synthetic resin; and a film layer formed on the surface of the spool base material;

wherein said film layer includes a base metal layer formed on the entire surface of the spool base material according to a non-electrolytic plating method and an outer film layer formed on the entire surface of said base metal layer.

2. A spool for use in a fishing reel as set forth in claim 1, wherein said outer film layer is formed according to an electrolytic plating method.

3. A spool for use in a fishing reel as set forth in claim 1, wherein said outer film layer is formed according to a dry coating method.

4. A spool for use in a fishing reel as set forth in claim 1, wherein said spool base material is formed of fiber reinforced resin consisting of resin mixed with a given amount of reinforcing fibers.

5. A spool for use in a fishing reel, comprising:

spool base material formed of synthetic resin; and a film layer formed on the surface of the spool base material;

wherein said film layer includes a base metal layer formed on the surface of the spool base material according to a non-electrolytic plating method and an outer film layer formed on the surface of said base metal layer, and, wherein said spool comprises a fishing line winding barrel portion around which a fishing line can be wound, and a front flange portion and a rear flange portion formed respectively before and behind said fishing line winding barrel portion, and also wherein, if the outside dimension of said front flange portion is expressed as A, and the outside dimension of the portion of said fishing line winding barrel portion that is situated near to said front flange portion is expressed as B, then the ratio of said outside dimension B to said outside dimension A (B/A) is set in the range of 70%–90%.

6. A spool for use in a fishing reel as set forth in claim 5, wherein, if the outside dimension of said rear flange portion is expressed as C, then the ratio of said outside dimension C to said outside dimension A (C/A) is set in the range of 95%–105%.

7. A spool for use in a fishing reel as set forth in claim 5, wherein said fishing line winding barrel portion is tapered at a given angle in such a manner that the diameter thereof decreases continuously and smoothly as it goes from said front flange portion to said rear flange portion.

* * * * *